(12) United States Patent
Moor et al.

(10) Patent No.: US 7,869,887 B2
(45) Date of Patent: Jan. 11, 2011

(54) DISCOVERABLE SERVICES

(75) Inventors: Crisler Terrill Moor, San Jose, CA (US); John J. Baier, Mentor, OH (US); Kevin Chao, Mountain View, CA (US); Lance Christopher Rodenfels, Fairview Park, OH (US); Richard Lee Ryan, Pleasanton, CA (US); Robert J. McGreevy, Oswego, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 517 days.

(21) Appl. No.: 11/834,263

(22) Filed: Aug. 6, 2007

(65) Prior Publication Data

US 2009/0043404 A1 Feb. 12, 2009

(51) Int. Cl.
*G05B 19/18* (2006.01)
*G05B 13/02* (2006.01)
*G06F 19/00* (2006.01)
*G05B 19/418* (2006.01)
*G06Q 40/00* (2006.01)

(52) U.S. Cl. .............. 700/4; 700/29; 700/36; 700/27; 700/99; 705/8; 705/37

(58) Field of Classification Search .......... 700/4, 700/29, 36, 37, 99; 705/37, 8
See application file for complete search history.

(56) References Cited

U.S. PATENT DOCUMENTS

| | | | |
|---|---|---|---|
| 5,136,906 A * | 8/1992 | Antonissen et al. ............ 83/42 |
| 5,282,261 A * | 1/1994 | Skeirik ......................... 706/23 |
| 5,937,080 A * | 8/1999 | Vogeley et al. ............... 382/110 |
| 6,341,243 B1 * | 1/2002 | Bourne et al. ................ 700/165 |
| 7,099,855 B1 * | 8/2006 | Nelken et al. .................. 706/50 |
| 2007/0129814 A1 * | 6/2007 | Dionne ........................... 700/2 |
| 2009/0204245 A1 * | 8/2009 | Sustaeta et al. ............... 700/99 |

OTHER PUBLICATIONS

Thurston et al., "Standards Developments for Condition-Based Maintenance Systems" 2002 p. 1-11.*
Muller et al., "*Probabilistic vs. Dynamical Prognosis Process Based E-Maintenance System*", 2004. 1-7.*
Hung et al., "Development of an Ethernet-based Equipment Intergration Framework for Factory Automation", 2004. Elseveier, p. 369-383.*

* cited by examiner

*Primary Examiner*—Albert Decady
*Assistant Examiner*—Tom Stevens
(74) *Attorney, Agent, or Firm*—Turocy & Watson LLP; William R. Walburn; John M. Miller

(57) ABSTRACT

A goal or desired output can be stated in terms of a high-level overview in a natural language or other format. The high-level overview can be automatically partitioned into steps to be performed in order to achieve the stated goal, such as by interpreting terms within the overview, analyzing definitions, historical data or other information. Each step can be dynamically assigned to various resources distributed throughout an environment. Such resources can include agents or other machinery that are selected based on a multitude of criteria including location, availability, performance level as well as other factors. If needed, the resources can be dynamically balanced in order to achieve the desired output while mitigating wasted resources.

20 Claims, 10 Drawing Sheets

DISCOVERABLE SERVICES

TECHNICAL FIELD

The subject invention relates generally to an industrial process, and more particularly to a control system that employs a distributed intelligent agent infrastructure to effect implementation of activities to achieve a desired output.

BACKGROUND

Complete or partial automation in factories, manufacturing facilities, and the like is possible through utilization of industrial control systems. Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables and/or inputs reflecting the status of a controlled system and changes outputs effecting control of such system.

Industrial control systems have enabled modern factories to become partially or completely automated in many circumstances. These systems generally include a plurality of input/output (I/O) modules that interface at a device level to switches, contactors, relays and solenoids along with analog control to provide more complex functions such as Proportional, Integral and Derivative (PID) control or multi-input multi-output (MIMO) or model-reference adaptive control (MRAC). Communications have also been integrated within the systems, whereby many industrial controllers can communicate through network technologies such as Ethernet, Control Net, Device Net or other network protocols. Generally, industrial controllers utilize the aforementioned technologies along with other technologies to control, cooperate and communicate across multiple and diverse applications.

Distributed industrial systems have emerged to assist in intelligent monitoring (e.g., through sensors) of an industrial system. An example of such a system is an agent-based manufacturing control system. These agent-based systems and/or networks are evolving into robust control systems for large series production control systems. In general, an agent-based control system employs a community of autonomous, intelligent computational units referred to as "agents." Respective agents can typically be responsible for local decision-making and control of one or more explicit portions of a manufacturing process. A key element in such a system is cooperation among the agents in order to provide a desirable global behavior of controlled systems and/or processes.

With ever shorter product life-cycles, decreasing product launch times, and increasing product variety, conventional manufacturing processes need quick deployment of tasks while maintaining high product quality and low manufacturing costs. Agent technology is well suited to addressing the control aspects of these manufacturing requirements. As autonomous decision-makers, agents are able to dynamically react to unforeseen events, exploit different capabilities of components, and/or adapt flexibly to changes in their individual environment.

SUMMARY

The following presents a simplified summary in order to provide a basic understanding of some aspects of the disclosed examples. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with providing implementation of various processes that are expressed in terms of a high-level overview. The high-level overview can be received and dynamically broken down into its subcomponents, such as steps or activities, which can be implemented within various areas. Resources at different functional areas or at different levels can implement the activities through interaction and communication among the various resources.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
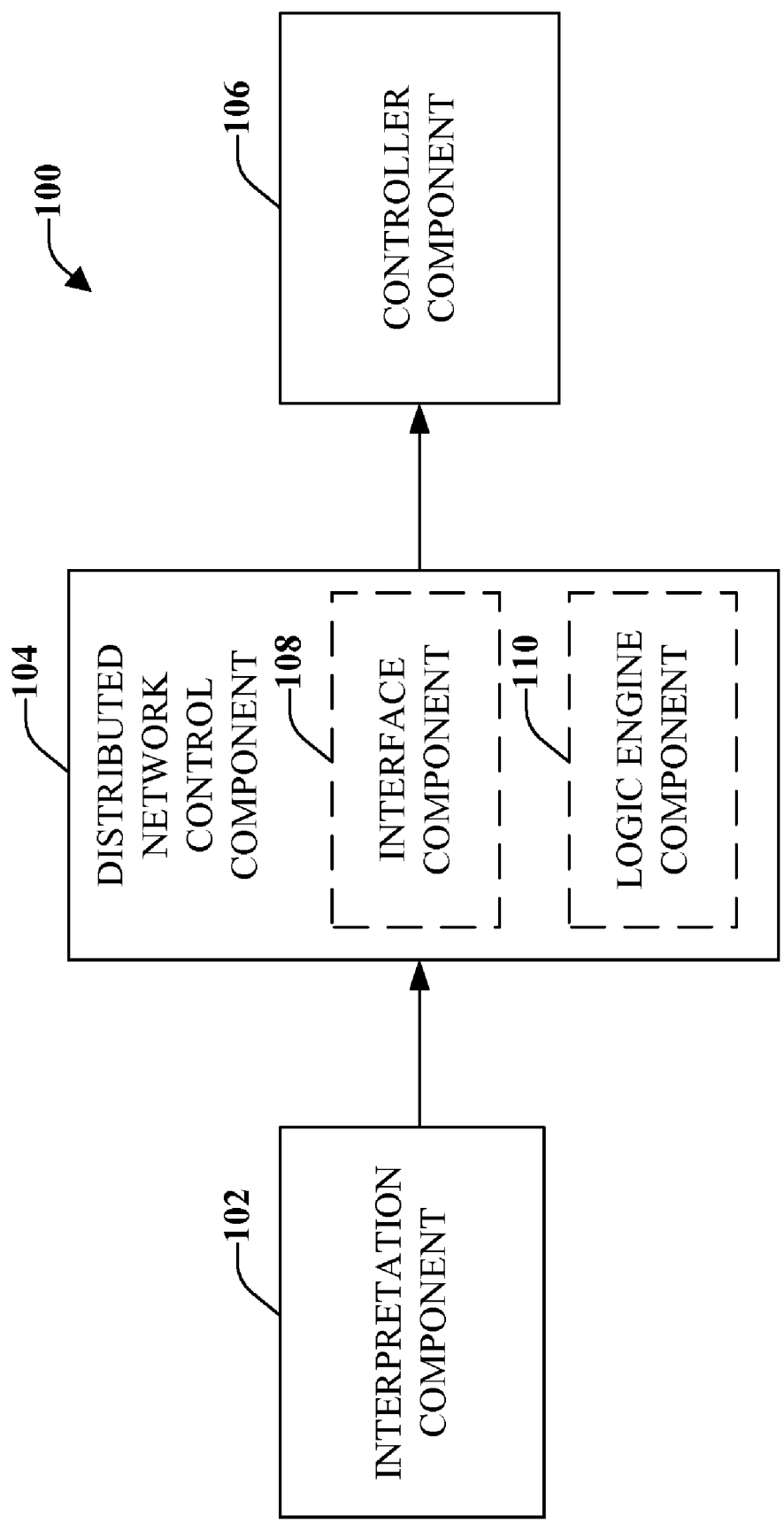
FIG. 1 illustrates an example system that automatically constructs and implements activities within an industrial automation environment.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well known structures and devices are shown in block diagram form in order to facilitate describing these embodiments.

As used in this application, the terms "component," "agent," "module," "system," "controller," "device," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), and so forth), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

The various embodiments disclosed herein can operate separately or in conjunction with numerous systems including Advanced Process control, various business systems, machine or manufacturing execution systems (MES), MES Appliances, and so forth. A MES system can include integration with an Enterprise business system, Quality system, Warehouse and supply chain systems, and so forth. An MES system can include key functions, such as detailed scheduling, work order execution and dispatching, definition management, resource management, data collection, and order management. An MES Appliance can perform processing related to various aspects (e.g., business logic, data storage, and so on), can be incorporated on software modules that can operate various aspects of a business, manufacturing environment and the like and can operate and be serviced utilizing various information technology resources. The multitude of systems can directly or indirectly derive their value out of configuration and interaction with Manufacturing/Automation systems and/or other MES type systems. Additionally, the various aspects can be employed in an industrial automation environment and/or in other environments in which such aspects are deemed appropriate.

Referring initially to FIG. 1, illustrated is an example system 100 that automatically constructs and implements activities within an industrial automation environment. System 100 can be configured to create and implement process steps or activities for achieving an end result based in part on receiving a request for the end result. The creation of the process steps or activities can be based on various types of information including historical information, information relating to similar or related processes, sub-portions of similar or related processes; individual steps in disparate processes, steps not related to a process, as well as other information, parameters and/or inputs.

In further detail, system 100 can include an interpretation component 102 that can be configured to understand a desired end result provided by a user and/or entity (e.g., the Internet, another system, a computer and so forth), hereinafter referred to as user. The desired end result can be expressed as a high-level overview or in other terms, such as a goal, outcome, best case scenario, desired result, end product and so forth. Interpretation component 102 can further be configured to create at least one sub-process in order to achieve the desired end result. The sub-process can be a step in the process, an action that should be performed to achieve the result, a logical order of events, and so forth. For example, interpretation component 102 can receive the desired end result and divide the result in one or more activities in order to achieve the result.

To create the at least one sub-process, interpretation component 102 can divide the stated desired end result into smaller components, subsets, steps or the like. Interpretation component 102 can further place the subsets in a logical order or workflow in which the various actions should be taken. For example, interpretation component 102 can access various services that can be utilized to achieve the desired end result and can implement the performance of such services by one or more system 100 components configured to perform the service.

In accordance with some aspects, interpretation component 102 can determine objects and/or behaviors (e.g., how an activity is carried out, functions associated with an activity, and so forth) that should be implemented to achieve the desired end result. Such objects and/or behaviors can be loaded into a controller, such as a PLC, for further processing. For example, from the desired end result a workflow can be designed and translated to a PLC. The workflow can be expressed in the form of a generic language or standard workflow language that can be used as an intermediate language between the high-level overview and a PLC code. Various code utilized by system components can include upper level language (e.g., JAVA, BPLA) and can include ladder logic.

Interpretation component 102 can communicate with a distributed network control component 104 and a controller component 106 in any manner that is known or becomes known. The communication protocol between the interpretation component 102 and the other components (104, 106) can employ any wired or wireless techniques. For instance, in one wired aspect, an Ethernet architecture can be employed. Moreover, in wireless aspects, an IEEE 802.11, Bluetooth™, Infra Red, Internet, or the like can be employed.

Distributed network control component 104 can be configured to control and/or monitor information relating to the operation of individual network components (e.g., agents) which together form the distributed network. Monitoring can include utilization of a vision system that can automatically record events occurring within (or in proximity of) the system 100. Further information relating to these agents will be discussed below. Distributed network control component 104 can be configured to assign responsibility of completion of each subpart of the entire process to one or more agents distributed throughout an industrial manufacturing environment.

Distributed network control component 104 can further monitor the operation of individual manufacturing machines (e.g., lathes, extruders, drills, mixers) in an industrial process. Although specific examples are described herein, it is to be understood that the various aspects can be employed in connection with any device capable of being controlled and/or monitored by a distributed control system. Alternate examples can include, but are not to be limited to, actuatable machines, sensors, communication devices and other input/output devices. If a machine or agent is not performing an assigned responsibility at a predetermined performance level (e.g., 100 widgets an hour, less than 1% scrap and so forth), distributed network control component 104 can reassign the responsibility to a different machine or agent.

Distributed network control component 104 can also be configured to determine a location for the individual network components that can be configured to perform or carry out at least a sub-portion of one or more process subcomponents. The individual network components can implement the sub-portion activities through interaction and communication between themselves and/or various devices (e.g., computers, industrial automation controls, PLCs, MES system, and so forth). The individual network components can be configured to manually carry out functions or they can be configured to guide functions that can be performed by manual labor or through machinery, including robots.

Distributed network control component 104 can include an interface component 108 and a logic engine component 110. Interface component 108 can effect communication between distributed network control component 104 and interpretation component 102 and/or controller component 106. Logic engine component 110 can apply logical reasoning methods and algorithms to information obtained from interpretation component 102, distributed network control component 104 and/or controller component 106. It is to be appreciated that alternate aspects can employ artificial intelligence, rule based techniques or other machine learning techniques in order to automatically implement and perform the monitoring, reasoning and diagnostics activities. These alternate aspects will be discussed in further detail with respect to FIG. 5 below.

Figure 2:
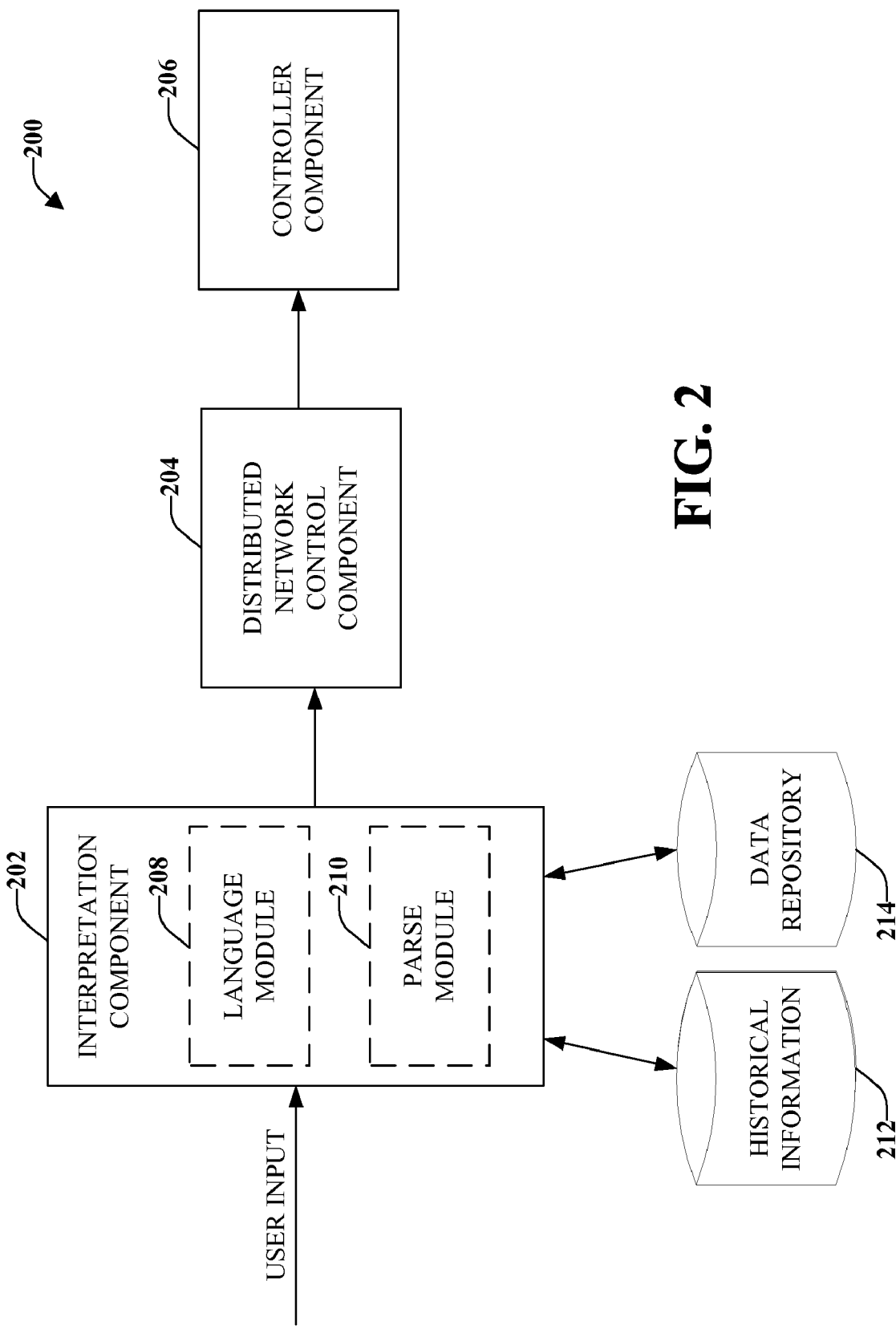
FIG. 2 illustrates another example system for receiving a high-level overview of a desired outcome and automatically implementing actions to achieve the desired outcome.

FIG. 2 illustrates another example system 200 for receiving a high-level overview of a desired outcome and automatically implementing actions that will achieve the desired outcome. System 200 can be configured to receive a desired goal expressed in various formats, determine what is needed to achieve the desired goal, and automatically implement actions to facilitate completion of the desired goal.

System 200 is similar to the system described in the above figure and includes an interpretation component 202 that interacts with a distributed network control component 204 and a controller component 206. In order to implement and perform functions associated with the desired outcome, interpretation component 202 can receive a user input that includes a desired outcome or goal. The user input can be in various languages and formats and a language module 208 can be configured to understand the disparate languages and/or formats. For example, language module 208 can be configured to understand an input expressed in natural language format such as "Produce 150 widgets in 10 minutes." or "Assemble 2000 motors with only 2% scrap." or other desired outcomes. The input can include a name of the output, name of sub-processes to achieve the outcome, name of similar processes or related processes and so forth. The input can also include a definition, such as parts necessary to assemble a product, tolerances and dimensions of a product to manufacture, steps necessary to produce a desired outcome, and so forth.

Interpretation component 202 can also include a parse module 210 that can be configured to determine the sub-portions or steps that should be performed to achieve the desired outcome. To break the desired outcome down into sub-portions, parse module 210 can selectively access a repository that contains historical information 212. The historical information 212 can relate to processes performed in the past, sub-portions of such processes, and other historical data (e.g., order of activities, machinery implementing the activities, time to complete entire process or sub-portions and so forth), such historical information can relate to a previous activity that is similar to the desired outcome. Parse module 210 may further access a data repository 214 that can include various information related to the desired outcome. Such information can include names of known-processes, cross-reference to similar processes based on keywords or the desired outcome itself, or various other types of information that can provide parse component 210 with information necessary to autonomously divide the desired outcome into sub-portions to achieve that outcome in a logical manner.

Historical information repository 212 and data repository 214 can retain various information therein in a readily retrievable format. Moreover, the repositories 212, 214 can be memory and/or some other medium that can store information. By way of example, and not limitation, the repositories 212, 214 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Interpretation component 202 can provide various types of user interfaces. For example, interpretation component 208 can provide a graphical user interface (GUI), a command line interface, a speech interface, Natural Language text interface, and the like. For example, a GUI can be rendered that provides a user with a region or means to load, import, select, read, etc. the user input, and can include a region to present the results of the interpretation of the user input (e.g., information relating to how system 200 will implement the various actions). These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with interpretation component 202 to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 3:
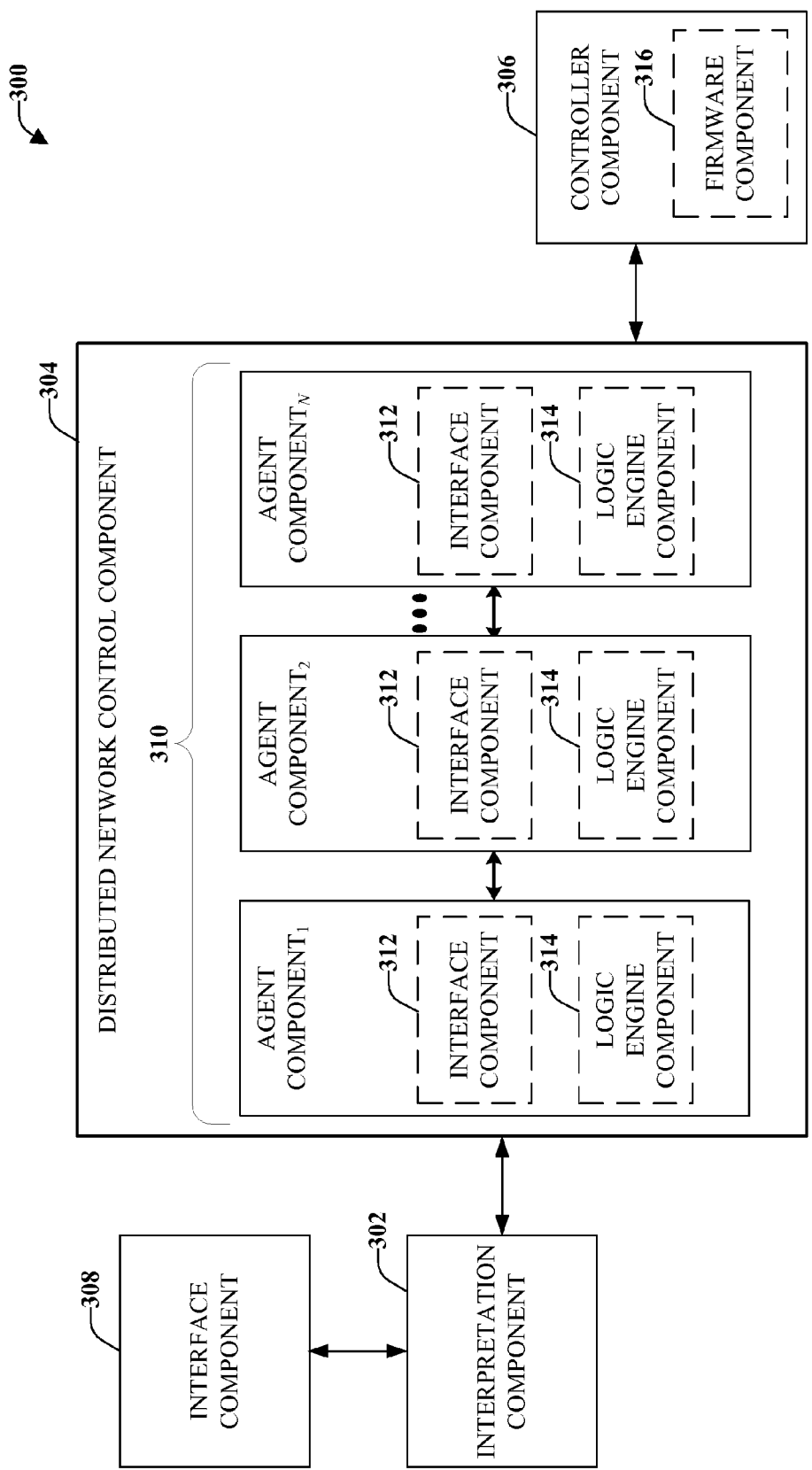
FIG. 3 illustrates an example system for automatically performing actions based on a desired output.

FIG. 3 illustrates an example system 300 for automatically performing actions based on a stated desired output. System 300 can be configured to dynamically determine where one or more agents should be placed within an industrial environment to perform various activities. System 300 can further dynamically balance the activities being performed in the industrial environment.

In more detail, system 300 is similar to the system of the preceding figure and can include an interpretation component 302, a distributed network control component 304 and a controller component 306. Interpretation component 302 can be configured to receive an input that states a desired output (e.g., a high-level process) from an interface component 308. The input can be in natural language format or another format type.

As illustrated, distributed network control component 304 can include 1 to N agent components, where N is an integer. Agent components 1 to N can be referred to individually or collectively as agent components 310 and can perform agent-to-agent communication (e.g., the agents communicate directly to each other). Each individual agent component can include an interface component 312 and logic engine component 314. Thus, the agent components 310 can establish system diagnostics and perform desired logic and/or reasoning in a distributed manner by collaborating with each other in order to create diagnostic intelligence in a naturally emerging manner. For example, each agent can detect incorrect or erroneous data or logic in one or more step or activity associated with the desired output. The agents can further be configured to recommend corrections to incorrect data, autonomously correct the data and/or validate an error correction.

It will be understood that, with respect to the deployment of intelligent agent components 310, any desired communication protocol and agent discovery system can be utilized. For example, Contract Net, Auction, Market-based Model and Global Resource Locators (e.g., directory facilitators) or the like can be used. By way of further example, operating in accordance with such protocols, the agents can modify their communication and negotiation behavior in ways that can result in a reduction in the number of signals that are sent among agents and thereafter processed. This, in turn, can reduce the amount of communication that occurs among the agents 310 and can increase the speed of collaborative decision-making among the agents 310.

In an aspect, messages between disparate agents 310 can be scripts communicated in a job description language (JDL), and wrapped in additional formatting information in accordance with a specialized, universally-accepted communication language, for example, the Foundation for Intelligent Physical Agents (FIPA) Agent Communication Language (ACL) or the Open Systems Architecture for Condition Based Maintenance (OSA-CBM). In alternate aspects, other interaction protocols and communication languages can be employed without departing from the aspects disclosed herein.

Moreover, the communication within the agent infrastructure can be bound by a defined criteria (e.g., meta-level). This convergence criteria can be employed to assist in avoiding infinite cycling between agent components 310. In one aspect, the meta-level criteria can be user defined from a primary rules perspective. It will be appreciated that, through collaboration and/or learning, the agent components 310 can combine the knowledge and evolve the state of the rules to create boundaries whereby the system 300 operates within reasonable ranges.

Additionally, the controller component 306 can include a firmware component 316. Firmware component 316 can be conventional such that it includes programming that can be found in controllers employed in non-agent-based distributed control systems, particularly conventional non-agent-based industrial controllers. Firmware component 316 can facilitate processing interactions between the controller component 306 and devices (not shown) external to the controller component 306. For example, the firmware component 316 can facilitate formatting signals produced by the agent(s) 310 for communication onto a network such that the signals can be sent to other controllers (not shown) in accordance with desired diagnostic schemes and results. In other words, the firmware can facilitate formatting signals to configure them in accordance with a protocol of the network (e.g., in accordance with the requirements of an Ethernet, ControlNet or DeviceNet-type network and/or, in some embodiments, the TCP/IP or UDP/IP protocol, or the IEEE802.11b (wireless) protocol). Likewise, the firmware component 316 is able to receive and process signals from the diagnostic component (e.g., interface component and logic engine, 312, 314). The firmware component 316 can also facilitate the creation and use of (and otherwise support the operation of) application-specific control software, which can govern the manner in which the agent(s) 310 controls and/or monitors the machine(s) (not shown) assigned to the agent(s) 310.

Figure 4:
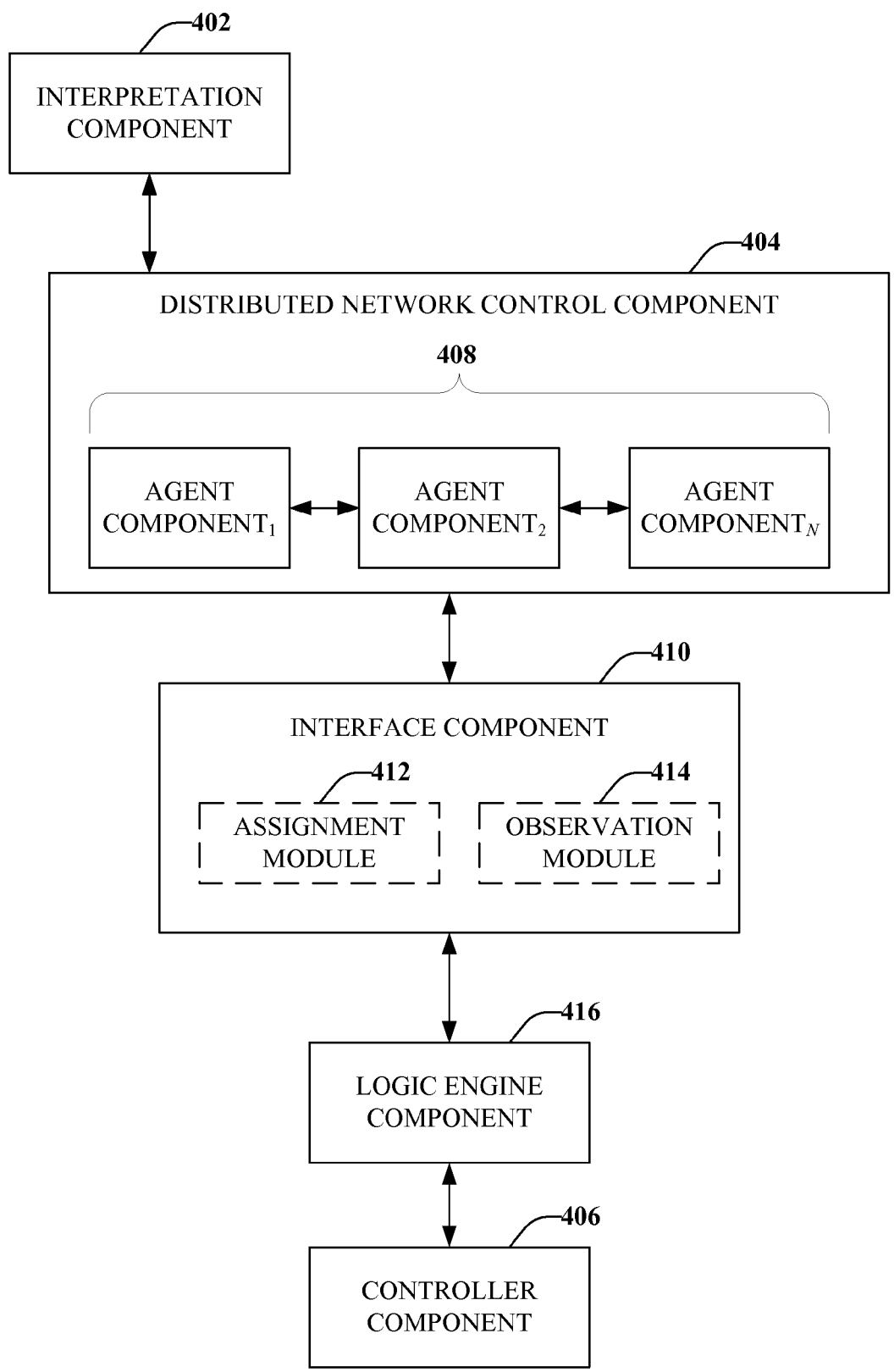
FIG. 4 illustrates another example system for selectively carrying out and monitoring actions to achieve a desired result.

FIG. 4 illustrates an example system 400 for selectively carrying out and monitoring actions to achieve a desired result. As illustrated, system 400 includes an interpretation component 402 that can be configured to receive a user input that includes a desired result, break the desired result into subsets of activities, and communicate the activity subsets to a distributed network control component 404 and a controller component 406. The distributed network control 404 can include various agents, labeled collectively at 408.

System 400 can employ an interface component 410 having an assignment module 412 and an observation module 414 therein. Assignment module 412 can be configured to assign the activity subsets to various agents that can be in a distributed environment. Assignment module 412 can assign the activity subsets by determining which agents are available, the resources that can be provided by available agents, the location of the available agents and other information that would be helpful in assigning the activity subsets to agents or combinations thereof. Assignment module 412 can access the information from each agent individually or can access the information from a multitude of agents at substantially the same time. If a particular agent is not available or becomes unavailable after an activity set has been assigned, assignment module 412 can be configured to redistribute the workflow by reassigning the activity to one or more other agents, for example. Such redistribution can mitigate wasted resources and/or move activities from resources that are not performing to a predetermined performance level.

Observation module 414 can be configured to monitor the activities being performed by the various agents. For example, observation module 414 can monitor a workflow of an entire process and individual stages within the process. If there is a problem found at one or more stages (e.g., a bottleneck, not enough material to complete a project or other issues), observation module 414 can notify assignment module 412 of the problem. Assignment module 412 can discover other services and/or agents that can correct the problem and dynamically reassign one or more tasks.

Although the illustrated aspect employs the assignment module 412 and an observation module 414 integral to the interface component 410, it is to be understood that assignment module 412 and observation module 414 can be employed in any location. For example, either or both assignment module 412 and observation module 414 can be employed within the agent component 408 itself thus transferring information to interface component 410. Once obtained, the information can be compiled and processed by logic engine component 416. Moreover, system 400 can be configured to record the information obtained from the agent (s). Similarly, assignment module 412 and/or observation module 414 may be integral to the controller such as a programmable logic controller (PLC) or a variable frequency drive (VFD) that provides sensor data and computed sensor or state data to the interfacing component.

In accordance with some aspects, each agent component 408 includes an interface, logic engine assignment module and/or observation module. Accordingly, the agent component(s) 408 in this alternate aspect can configure, diagnose and/or reconfigure the distributed network control component 404 through agent-to-agent communication. For example, system 400 can identify and/or address problems such as congestion in one or more areas and redistribute the workload or suspend operations in one or more area to better optimize the use of resources.

In an alternate aspect, the logic engine component 416 can be employed in a simulation manner such that system 400 can simulate the effects of particular situational criteria. It is to be appreciated that the example discussed herein are not intended to limit the novel configuration and monitoring functionality of the various aspects. In other words, it is to be understood that the novel aspects and functionality can be employed in connection with any application (e.g., manufacturing, commercial, building or facility structure, vehicle, municipal system, health and industrial environments) capable of being configured and/or diagnosed through an intelligent system. Other applications include, but are not intended to limit, water distribution systems (land or ship based), power systems, pollution control systems, bio-hazard systems, recycling systems or the like. Essentially, the novel aspects described herein can be employed in connection with any industry to perform functions such as to automatically achieve desired outputs, monitor performance and distribution of various resources to achieve the desired outcome, diagnose problems encountered during operation, and/or effect system reconfiguration.

Figure 5:
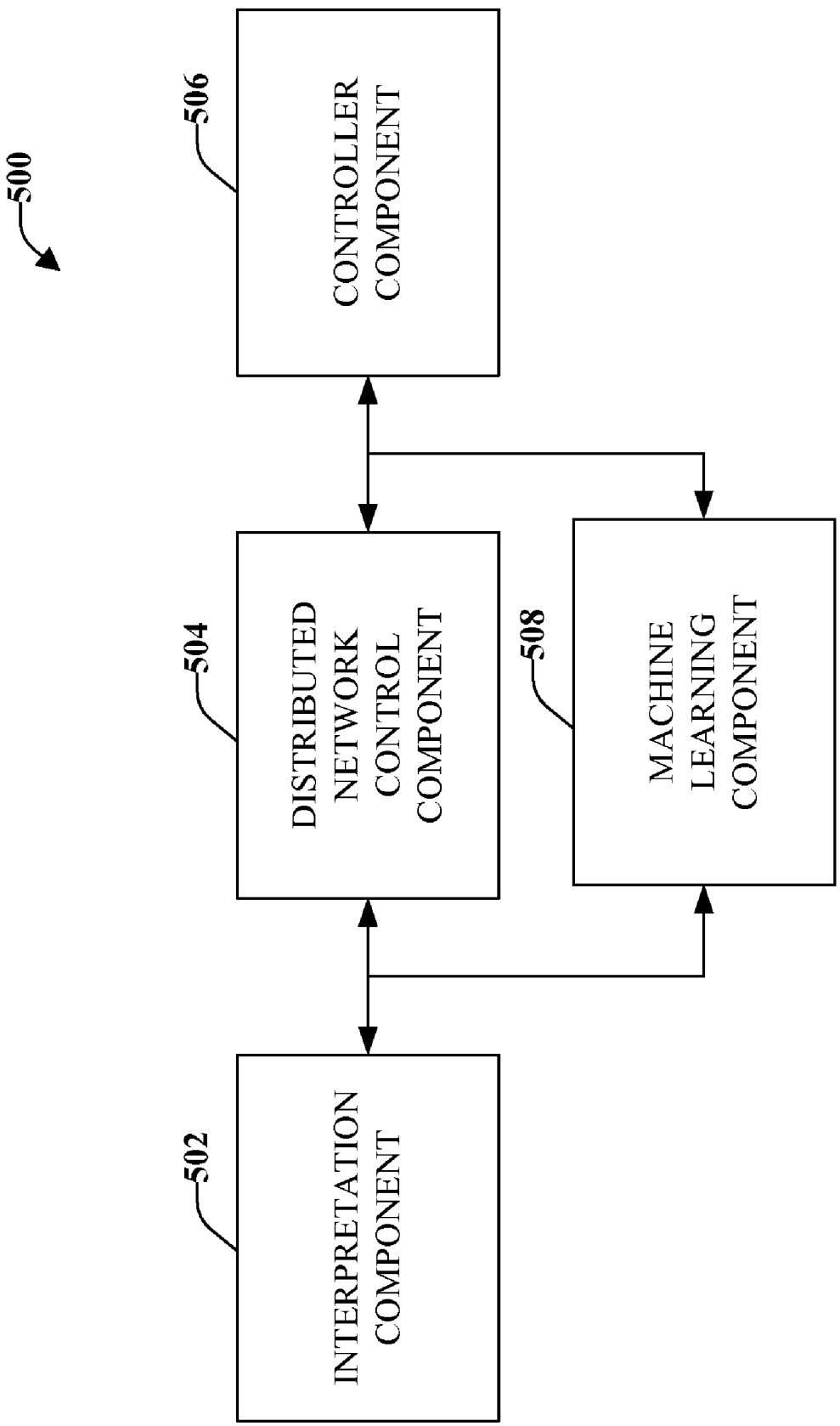
FIG. 5 illustrates a system that employs machine learning techniques that can facilitate automating one or more features in accordance with the one or more aspects disclosed herein.

FIG. 5 illustrates a system 500 that employs machine learning techniques that can facilitate automating one or more features in accordance with the one or more aspects disclosed herein. The various aspects (e.g., in connection with receiving a desired intent, determining how to enable that intent and facilitating actions to achieve the intent) can employ various machine learning-based schemes for carrying out various aspects thereof.

The machine learning component 508 can employ various machine learning techniques, algorithms, approaches, etc. to identify and/or implement actions (e.g., artificial intelligence, rules based logic and so forth). For example, the machine learning component 508 can employ a machine learning algorithm that can reason about or infer a process for determining if a particular activity should be utilized for a particular output, which agents should be utilized to implement the action, and so forth, which can be facilitated through an automatic classifier system and process. In another example, a process for determining whether a particular activity or location should be modified based on various external and internal factors can be facilitated through an automatic classifier system and process. Inference can be employed to identify an action and/or can generate a probability distribution over the action data and/or components identified within this action as potential process steps. Such inferences can be probabilistic—that is, the computation of a probability distribution over entities identified within the data. Inference can also refer to techniques employed for rendering higher-level decisions.

Various classification (explicitly and/or implicitly trained) schemes and/or systems (e.g., boosting classifiers, transduction classifiers, inductive classifiers, support vector machines, neural networks, expert systems, Bayesian belief networks, fuzzy logic, data fusion engines . . . ) can be employed in connection with performing automatic detection of activities and/or activity sets in accordance with the disclosed examples. In general, a classifier is a function that maps an input attribute vector, $x=(x1, x2, x3, x4, xn)$, to a confidence that the input belongs to a class, that is, $f(x)$ =confidence(class). Such classification can employ a probabilistic and/or statistical-based analysis (e.g., factoring into the analysis utilities and costs) to automatically differentiate text from other entities within an image. One example of a suitable classifier is a support vector machine (SVM), which, in general, operates by finding a hypersurface, which attempts to split triggering criteria from non-triggering criteria, in the space of possible inputs. This can make the classification suitable for testing samples, data, etc. that is near, but not identical to training data. The classifier(s) can be used to automatically learn and perform a number of functions, including but not limited to determining according to a received intent when to select an action or sequence of actions, when to change an action, when to selectively redistribute actions, etc. The criteria can include, but is not limited to, the amount of steps or a sequence of activities described by the received intent, the type of activity, the agent performing the activity, the importance of the activity, problems experienced with performing the activity and so forth.

In accordance with an alternate aspect, an implementation scheme (e.g., rule) can be applied to control and/or regulate performance of activities, generation/modification of activities and/or selectively changing an agent performing the activity and so on. It will be appreciated that the rules-based implementation can automatically and/or dynamically modify various actions based upon a predefined desired intent. In response thereto, the rule-based implementation can automatically determine steps to achieve the intent, assign one or more steps to various agents and/or suggest alternative means to achieve the intent by employing a predefined and/or programmed rule(s) based upon any desired criteria (e.g., desired output, number of activities necessary, type of activities need, activity length, activity importance, resource performing the activity, and so forth).

By way of example, a user can establish a rule that can require a trustworthy flag and/or certificate to utilize an agent whereas, other resources within a particular system may not require such security credentials. It is to be appreciated that any preference can be produced through pre-defined or pre-programmed forms of a rule. It is to be appreciated that the rules-based logic can be employed in addition to or in place of the artificial-based components and/or machine learning component 508.

Figure 6:
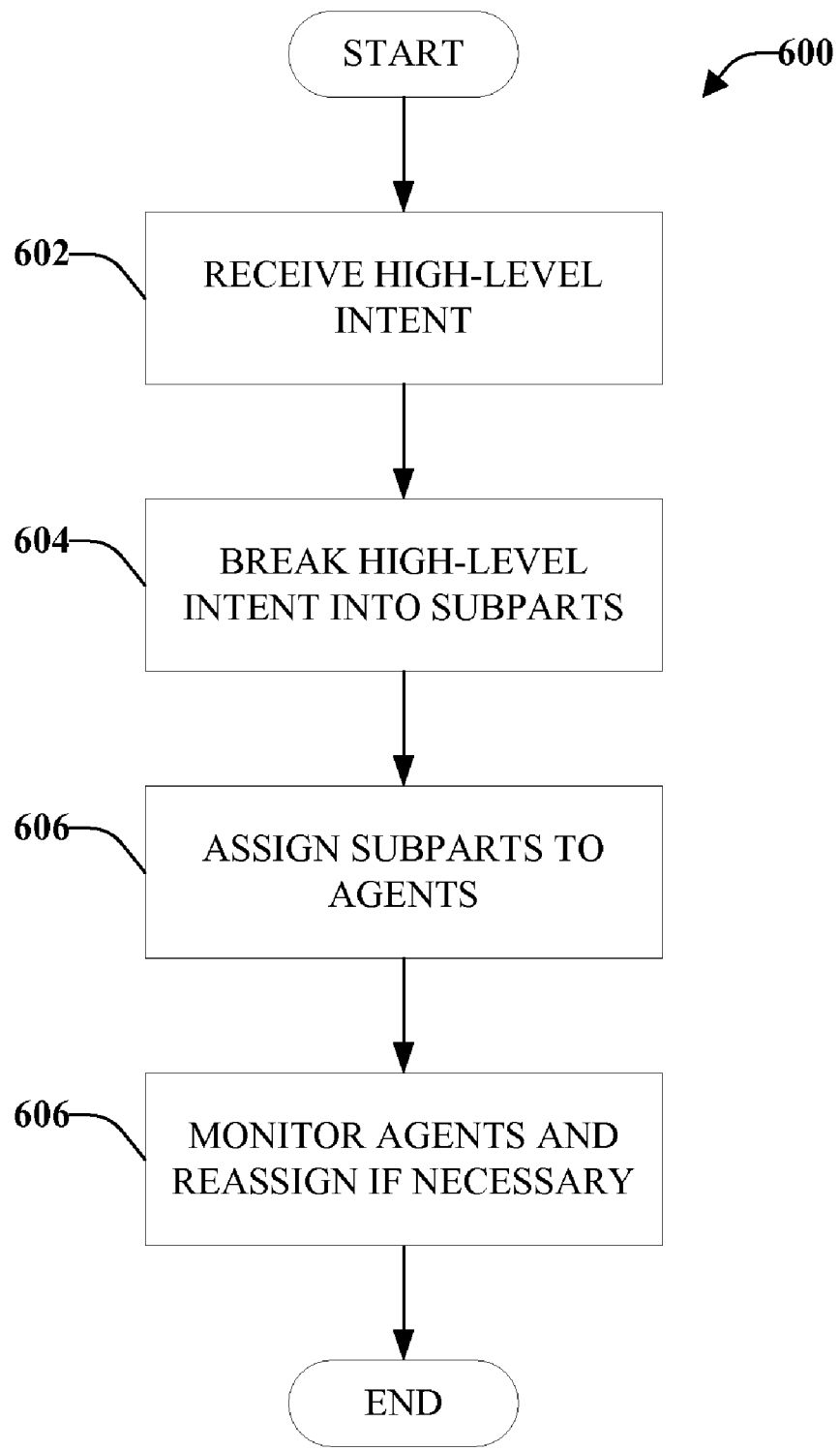
FIG. 6 illustrates a method for dynamically assigning activities to disparate agents to dynamically achieve a high level intent.
Figure 7:
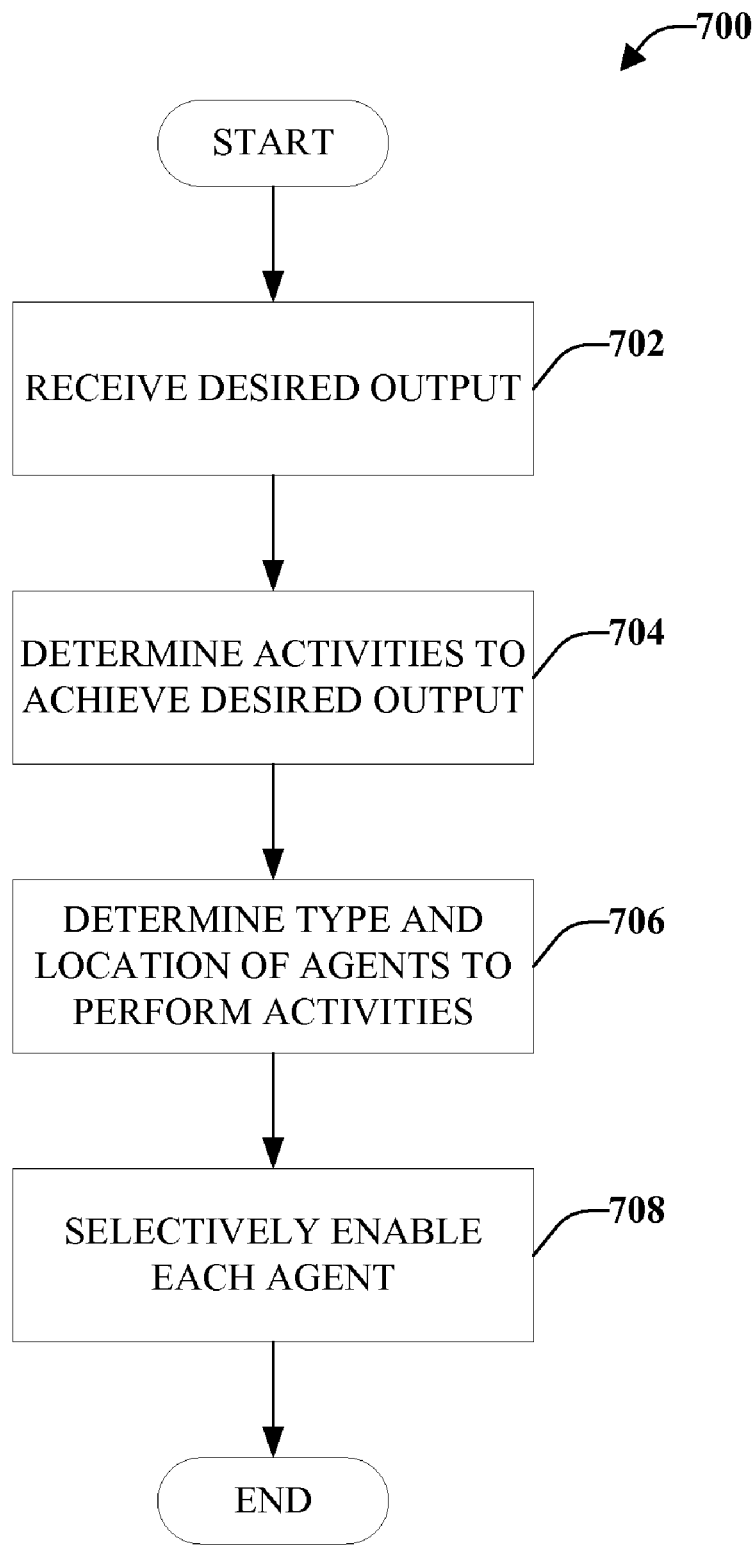
FIG. 7 illustrates a method for selectively providing a desired output based on selecting and enabling resources.
Figure 8:
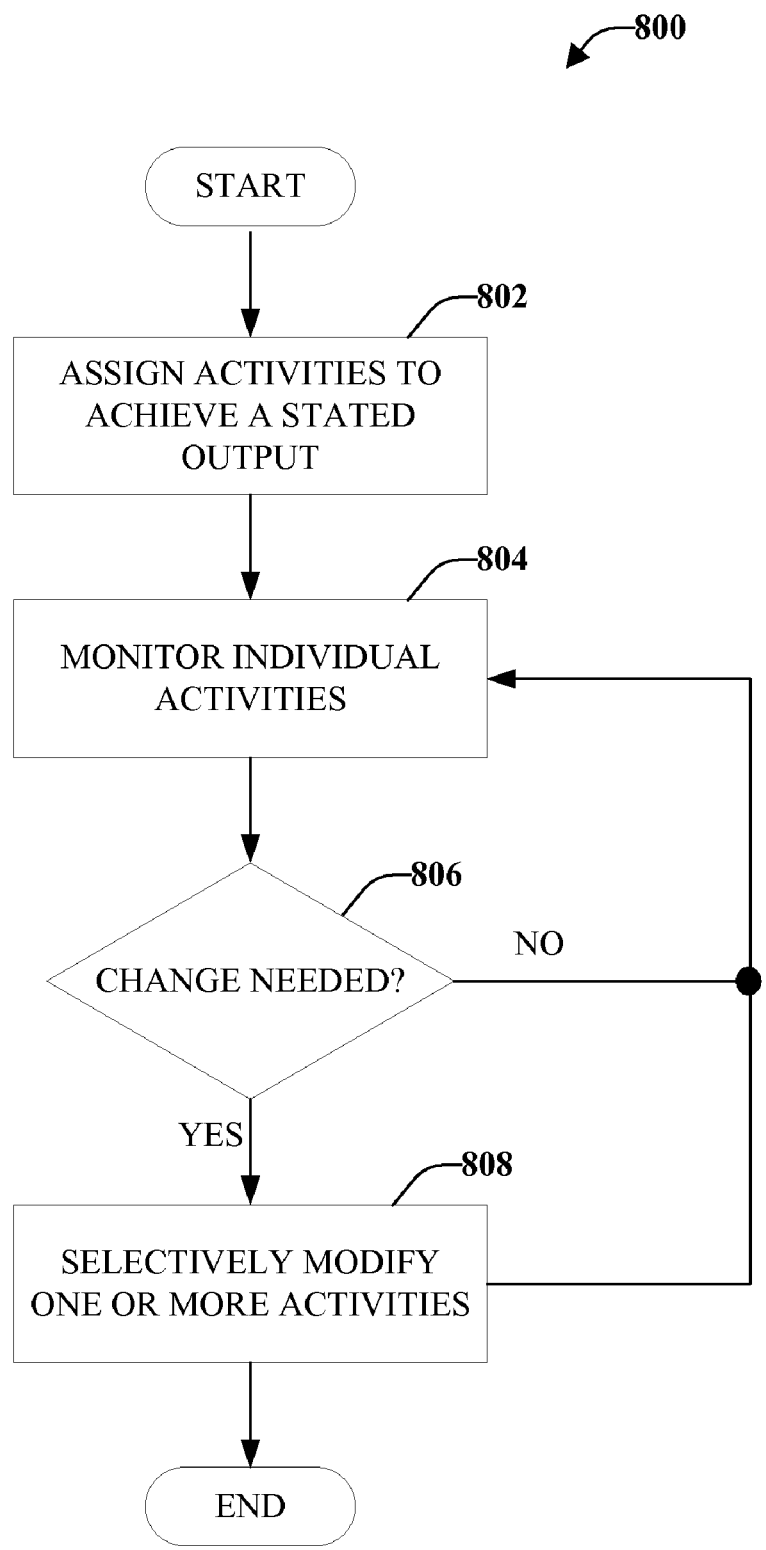
FIG. 8 illustrates a method for monitoring activities and automatically modifying one or more activities as needed.

In view of the exemplary systems shown and described above, methodologies that may be implemented in accordance with the disclosed subject matter, will be better appreciated with reference to the flow charts of FIGS. 6-8. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 illustrates a method 600 for dynamically assigning activities to disparate agents to achieve a high level intent. Method 600 can accept a request for a desired output or end result and facilitate completion of various activities in order to achieve the desired end result. At 602, the desired end result can be received, such as in the form of a high-level intent. The input can be received in various languages and formats including natural language which might be spoken, written (e.g., text message), chosen from a drop down menu or dialog boxes, or though other understandable means.

The high-level intent is divided into sub-components, at 604. The sub-components can represent various actions that should be performed, wherein a totality of the sub-components can produce the desired end result. The sub-components can be assigned to one or more intelligent agents, at 606, wherein the agents are configured to autonomously perform the actions associated with the sub-components. Assigning the actions can involve discovering services and/or resources that can be performed by each agent. Assignment (or reassignment) can also include determining which agents are available to perform the actions as well as identifying agents that can be reassigned from other tasks and/or responsibilities to perform at least one of the actions associated with a sub-component.

At 608, the agents are monitored to determine if the agents are performing the actions according to parameters necessary to achieve the high level intent. If one or more agents are not performing at an expected level of competence, the action can be reassigned to a different resource. As such, method 600 can provide a means to reduce design, production and cycle times by accepting a high-level overview and dynamically assigning, reassigning and/or de-assigning resources to facilitate actions based in part on the high-level overview.

FIG. 7 illustrates a method 700 for selectively providing a desired output based on selecting and enabling resources. At 702, a desired output is received from a user and/or entity. The desired output could be a new or existing procedure, process or other goals. At 704, activities that need to occur in order to achieve the desired output are determined. All or some of the activities can be completed by agents distributed though an environment, such as an industrial automation environment. In accordance with some aspects, a subset of the activities is performed through manual labor in addition to machinery.

At 706, the location and type of the various intelligent agents and/or manual labor points are determined. This determination can be based in part on the availability of agents, a location of each agent, a capability of each agent and so forth. At 708, each agent is selectively enabled in order to perform the respective activities and achieve the desired output. The agents can be enabled at a proper sequence in order to carry out respective functions. If needed, the agents can be disabled (temporarily or permanently), such as when a next stage in a process is slow and cannot accept input from a preceding stage. In accordance with some aspects, there is agent-to-agent communication whereby the agents monitor the actions of each other to facilitate completion of an overall task or desired output. As such, method 700 can automatically and dynamically redistribute or balance resources as necessary.

FIG. 8 illustrates a method 800 for monitoring activities and automatically modifying one or more activities. At 802, activities are assigned to achieve a desired output. The activities can be small portions of a larger task or logical processes involved in completion of a task. The task can be received in the form of a request from a user for a goal, which can be related to various aspects of a business. The task or sub-portions of the task can be distributed though an environment, such as a manufacturing environment. A location of each task or sub-portion can be configured for efficiency purposes based on the resources available at that location and/or resources that can be made available. The tasks or sub-portions can be assigned to agents, machinery or other resources (including manual functions) in order to achieve the stated goal.

At 804, each activity (e.g., task or sub-portion) is monitored. Such monitoring can include receiving feedback from each resource or through other means (e.g., manual entry). At 806, a determination is made whether a change is needed to one or more resources. If it is determined, at 806, that a change is not needed ("NO"), method 800 continues at 804 where the activities are monitored. If a change is needed ("YES"), at 808 one or more tasks and/or the agents performing the task are selectively modified. For example, one resource might be performing a task quicker than another resource. As such, certain portions of a process might need to be slowed down and/or other portions increased in activity. In some situations, more resources might be assigned to a particular task or sequence of tasks in order to achieve the desired goal, which method 800 can autonomously implement.

Figure 9:
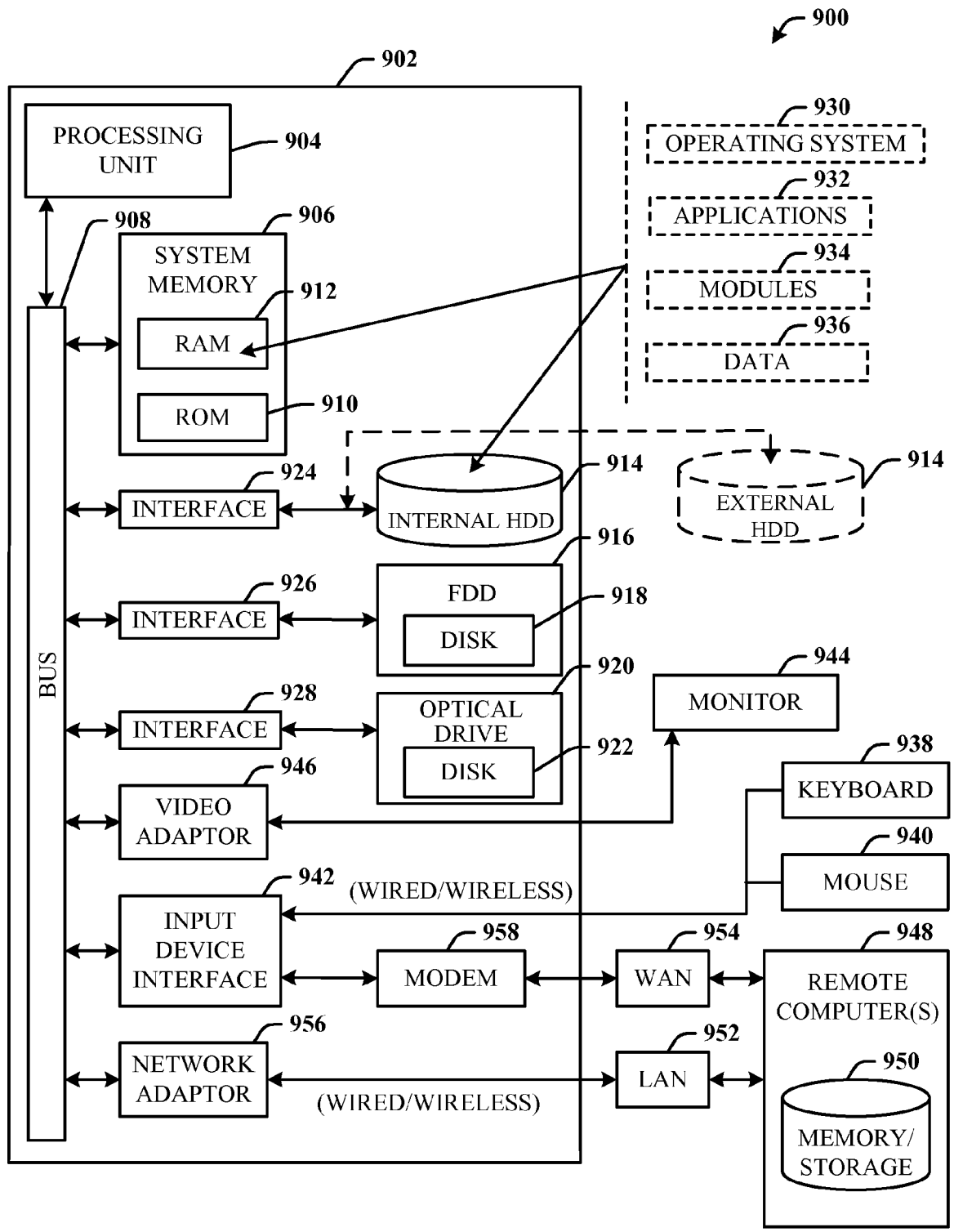
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated.

The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
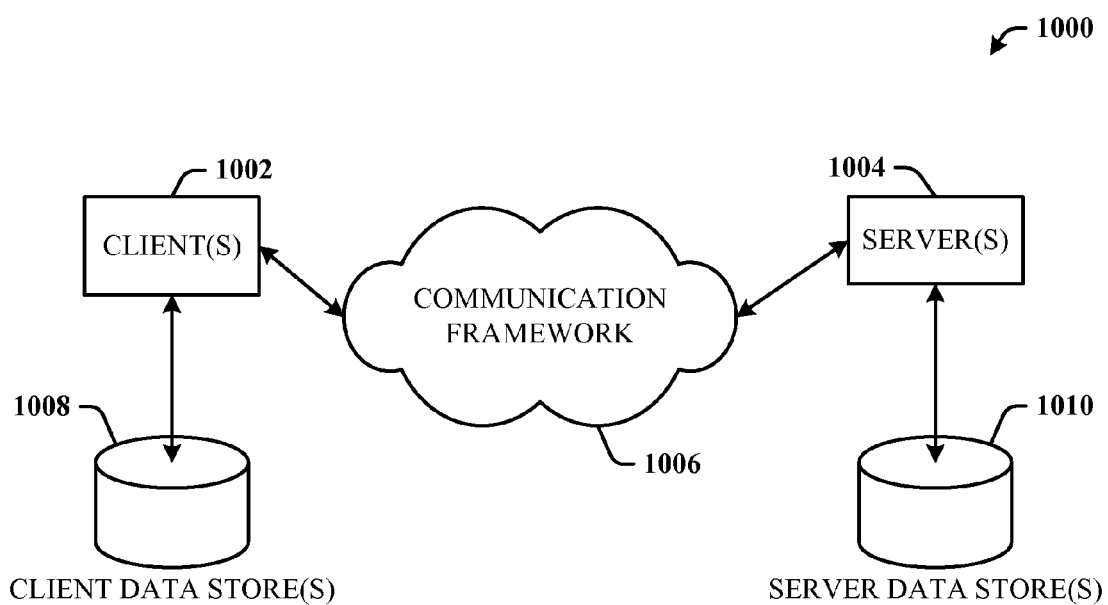
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more clients 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more servers 1004. The servers 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data stores 1008 that can be employed to store information local to the client(s) 1002 (e.g., cookie(s) and/or associated contextual information). Similarly, the server(s) 1004 are operatively connected to one or more server data stores 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

What is claimed is:

1. A system for automatic configuration of activities within an industrial automation environment, comprising:
    an interpretation component that receives a desired end result expressed in a natural language format, understands the desired end result, and partitions the desired end result into a first activity and at least a second activity; and
    a distributed network control component that assigns responsibility of completing the first activity to a first agent and the at least a second activity to a second agent, the first agent and second agent are located in an industrial automation environment, the distributed network control component further monitors performance of the first activity and the at least a second activity, the distributed network control component reassigns the first activity to another agent if performance of the first activity does not meet a predetermined performance expectation level.

2. The system of claim 1, the distributed network control component further monitors performance of the at least a second activity.

3. The system of claim 2, the distributed network control component reassigns the at least a second activity to one or more other agents if performance of the at least a second activity does not meet the predetermined performance expectation level.

4. The system of claim 1, the interpretation component further comprising a language module that understands the natural language format.

5. The system of claim 1, further comprising a parse module that accesses a historical information repository to obtain information relating to a previously performed action that is similar to the desired end result.

6. The system of claim 1, further comprising a parse module that accesses a data repository that retains data relating to the desired end result.

7. The system of claim 1, further comprising an assignment module that accesses a plurality of agents to ascertain for each agent at least one of an availability, a location, a provided resource or combinations thereof.

8. The system of claim 1, the first agent and the second agent communicate directly to each other.

9. The system of claim 1, further comprising an observation module that monitors the first activity and the at least a second activity and notifies an assignment module if there is a problem detected.

10. The system of claim 9, the assignment module dynamically reassigns responsibility of completing the first activity or the at least a second activity to one or more other agents if a problem was detected.

11. The system of claim 1, further comprising a machine-learning component that facilitates automation of one or more system component.

12. A method for providing resources and completion of an output expressed as a high-level request, comprising:
    receiving a desired outcome expressed in a natural language format;
    interpreting the desired outcome and partitioning the desired outcome into a plurality of sub-processes;
    assigning the plurality of sub-processes to agents, the agents autonomously perform actions associated with the sub-processes; and
    monitoring a performance of the agents and reassigning to another agent an action associated with a sub-process assigned to an agent if an agent is not performing at a predetermined level of expectation.

13. The method of claim 12, further comprises identifying agents that can be reassigned from other responsibilities to perform an action associated with at least one of the plurality of sub-processes.

14. The method of claim 12, further comprises selectively enabling the agents to perform the assigned sub-processes.

15. The method of claim 12, assigning the plurality of sub-processes to agents, comprising:
    determining which agents are available to perform the sub-processes; and
    identifying agents that can be reassigned from other responsibilities.

16. The method of claim 12, assigning the plurality of sub-processes to agents comprises determining a location of each agent and assigning the sub-processes based in part on the location of each agent.

17. The method of claim 12, assigning the plurality of sub-processes to agents comprises discovering services performed by each agent.

18. The method of claim 12, further comprising accessing a repository for historical data associated with the desired outcome.

19. A computer executable system that facilitates discovery of services for completion of a stated goal, comprising:
    means for receiving a stated goal expressed in a natural language format;
    means for parsing the stated goal into at least two process steps;
    means for selectively assigning the at least two process steps to two or more intelligent agents, wherein each intelligent agent is assigned at least one of the at least two process steps; and
    means for dynamically redistributing at least one of the at least two process steps to a different intelligent agent if one of the two or more intelligent agents can no longer perform the assigned at least one of the at least two process steps at a predetermined level of performance.

20. The computer executable system of claim 19, further comprising:
    means for interpreting the natural language format of the stated goal;
    the means for dynamically redistributing locating the two or more intelligent agents within an industrial environment; and
    means for monitoring a performance of the two or more intelligent agents.

* * * * *